(No Model.)
A. GAUKROGER.
SCREEN BOTTOM FOR CHARCOAL WASHING AND FILTERING TANKS.
No. 360,581. Patented Apr. 5, 1887.
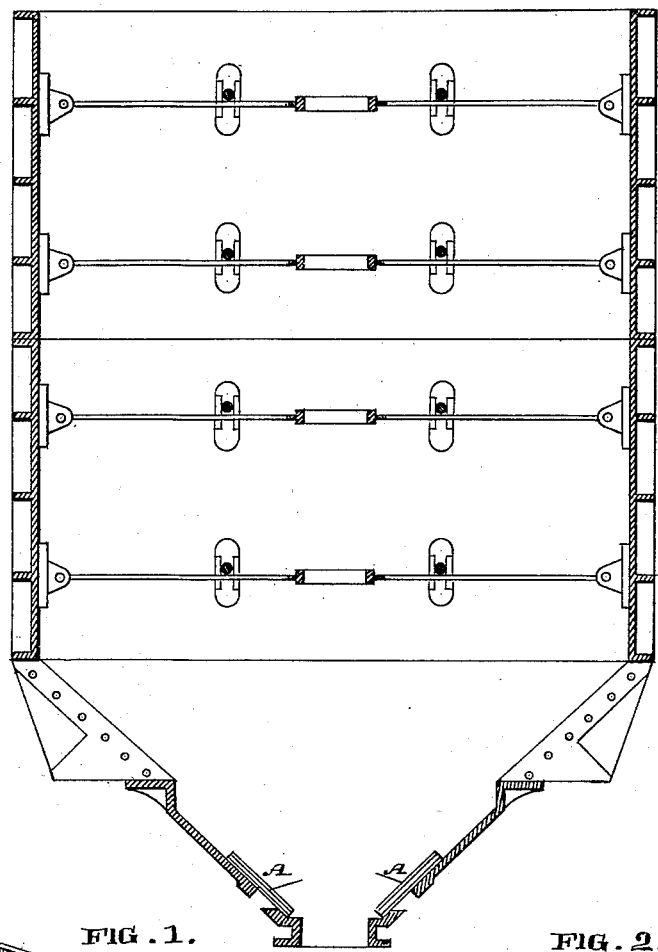
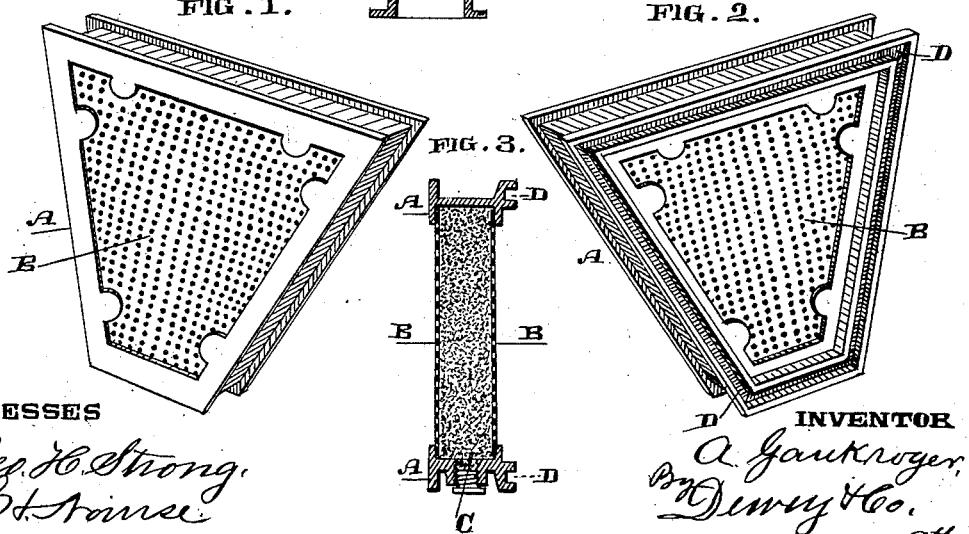
WITNESSES
Geo. H. Strong.
INVENTOR
A. Gaukroger,
By Dewey & Co.
Atty.

UNITED STATES PATENT OFFICE.

ALBERT GAUKROGER, OF SAN FRANCISCO, CALIFORNIA.

SCREEN-BOTTOM FOR CHARCOAL WASHING AND FILTERING TANKS.

SPECIFICATION forming part of Letters Patent No. 360,581, dated April 5, 1887.

Application filed May 1, 1886. Serial No. 200,871. (No model.)

*To all whom it may concern:*

Be it known that I, ALBERT GAUKROGER, of the city and county of San Francisco, State of California, have invented an Improvement in Screen-Bottoms for Charcoal Washing and Filtering Tanks; and I hereby declare the following to be a full, clear, and exact description of the same.

My invention relates to a screen-bottom to be used in connection with the tanks in which the charcoal used for purifying purposes in sugar-houses or elsewhere is washed and filtered.

It consists of a suitably-shaped casing having fine perforated or other screen material upon its upper and lower surfaces, and in combination with this a filling of coarse sand or fine gravel introduced into the bottom of the screen and between these surfaces.

Referring to the accompanying drawings for a more complete explanation of my invention, Figure 1 is a perspective view of my device, showing the top. Fig. 2 shows the bottom. Fig. 3 is a section through the center. Fig. 4 shows its application within the washing-tank.

The charcoal which is used for purifying the sugar-sirups is withdrawn from the chambers or tanks in which the filtering work takes place, and is removed to washing-tanks after it becomes necessary to clean or purify it, and it is usually washed out with a sufficient quantity of water, after which it is again burned and made ready for use.

For the purpose of preventing the loss of the fine charcoal by being washed away, it has been customary to form a screen or screens at the bottom of the washing-tanks, composed of strips of wood nailed to a frame, so as to stand parallel with each other and close together, and over these strips is stretched a blanket, which prevents the escape of the charcoal in the process of washing. Perforated plates may also be used, on which the blanket is stretched, if desired. These blankets become torn or worn, and often get displaced, so as to cause a great deal of trouble and loss of charcoal.

In my improvement, A is a metallic frame or casing made of the proper size and shape to fit the inclined bottoms of the washing-tanks or the charcoal-filter tanks, this frame forming continuous sides of a sufficient depth for the purpose. Upon the upper and lower sides of this frame is fixed a screen material, B, which may be of perforated metal, as shown, thus forming an inclosed casing the top and bottom of which are formed of screening material. Within the chamber thus formed coarse sand or fine gravel is introduced through an opening, C, at one side until it is completely filled, and the screen-bottoms are then put in place, as shown in Fig. 4. A channel or recess, D, is made around the lower edge of the screen-frame, to receive wooden or other packing strips, so as to make a tight joint around the bottom. The charcoal is then drawn out from the filtering or purifying tanks into the washing-tanks, and water is run through, so as to wash the charcoal, in the usual manner. These bottoms will prevent the escape and loss of the fine charcoal, and may be easily removed or cleansed at any time, or the gravel within them renewed whenever desired.

Having thus described my invention, what I claim as new, and desire to secure by Letters Patent, is—

1. A screen-bottom for filter and charcoal-washing tanks, consisting of a frame forming close sides, with a top and bottom formed of perforated or screen material, in combination with the filling of sand or gravel, substantially as herein described.

2. The screen-bottom with the perforated top and bottom and intermediate filling, in combination with the packing around the lower edge, substantially as described.

In witness whereof I have hereunto set my hand.

ALBERT GAUKROGER.

Witnesses:
  S. H. NOURSE,
  H. C. LEE.